(12) United States Patent
Grady

(10) Patent No.: US 6,591,085 B1
(45) Date of Patent: Jul. 8, 2003

(54) FM TRANSMITTER AND POWER SUPPLY/CHARGING ASSEMBLY FOR MP3 PLAYER

(75) Inventor: Jeff Grady, Durham, NC (US)

(73) Assignee: Netalog, Inc., Durham, NC (US)

( * ) Notice: Subject to any disclaimer, the term of this patent is extended or adjusted under 35 U.S.C. 154(b) by 0 days.

(21) Appl. No.: 10/197,367

(22) Filed: Jul. 17, 2002

(51) Int. Cl.$^7$ .............................. H04B 1/00; H04B 7/00
(52) U.S. Cl. .............................. 455/42; 455/66; 455/93; 455/99
(58) Field of Search ............................ 455/11.1, 66, 42, 455/73, 93, 23, 95, 99, 205, 345; 369/6, 8

(56) References Cited

U.S. PATENT DOCUMENTS

| | | |
|---|---|---|
| 6,240,297 B1 * | 5/2001 | Jadoul ........................ 455/466 |
| 6,292,440 B1 | 9/2001 | Lee |
| 6,396,769 B1 | 5/2002 | Polany |
| 6,420,849 B2 | 7/2002 | Murphy |
| 6,423,892 B1 | 7/2002 | Ramaswamy |
| 2002/0098813 A1 * | 7/2002 | Likourezos et al. .......... 455/93 |

FOREIGN PATENT DOCUMENTS

KR      2002010350     * 2/2002

OTHER PUBLICATIONS

2003–037045 Derwent.*

* cited by examiner

Primary Examiner—Nguyen T. Vo
(74) Attorney, Agent, or Firm—Steven J. Hultquist; Marianne Fuierer; Yongzhi Yang

(57) ABSTRACT

An FM transmitter and power supply/charging assembly electrically coupleable with an MP3 player. The assembly includes a modular docking unit having a main body portion with a docking cavity therein, wherein the main body portion contains the FM transmitter and power/charging circuitry, with coupling means in the docking cavity for connecting the MP3 player with the FM transmitter and power/charging circuitry, to accommodate FM transmission by the FM transmitter of audio content when played by the MP3 player in the docking cavity of the modular docking unit, and adapted for transmitting electrical power through the modular docking unit and the power/charging circuitry therein, for charging of a battery of the MP3 player and/or powering of the MP3 player.

20 Claims, 8 Drawing Sheets

FM TRANSMITTER AND POWER SUPPLY/CHARGING ASSEMBLY FOR MP3 PLAYER

BACKGROUND OF THE INVENTION

1. Field of the Invention

This invention relates to accessories for MP3 players used for on-line downloading, storage and playing of music. More specifically, the invention relates to an FM transmitter and power supply/charging assembly for such MP3 players, and to a kit comprising such assembly in combination with other mounting/power/charging accessories.

2. Description of the Related Art

Music players of widely varying type are ubiquitous throughout the world, and have evolved through various forms over the years, from portable single transistor radios in the 1950's to tape cassette players to compact disc players and more recently to MP3 players, which enable a user to download audio material from an internet site and store same in storage medium of a player in an MP3 (MPEG-1 audio layer 3) format for subsequent selective listening.

A number of MP3 players have been developed and are commercially available, including the Nomad jukebox commercially available from Creative Labs, SonicBlue's rio volt, jukebox recorder commercially available from Archos Technology, and numerous others. A high-capacity MP3 player of such type is the iPOD™ MP3 player commercially introduced by Apple Computer, Inc. (Cupertino, CAlif.) in 2001. The Apple iPOD has a capacity for approximately 1000 songs of commercial play length. MP3 players of the aforementioned type rely on batteries for their portability, and are typically provided with a headset for user listening.

One problem associated with the small size and light-weight characteristics of such MP3 players, as requisite to their portability and ease of use, is battery life. Another problem is the personal character of the headphone-equipped MP3 player. The MP3 player may be equipped with a speaker, but its small size and light-weight characteristics limit the size of the speaker, making it less than desirable when it is desirable to transmit music to a group of persons, such as in a vehicle passenger compartment, or a room.

SUMMARY OF THE INVENTION

The present invention relates in one embodiment to an FM transmitter and power supply/charging assembly for an MP3 player.

In one embodiment, the FM transmitter and power supply/charging assembly comprises a unitary and modular docking unit, in which the MP3 player is reposable in electrical communication therewith. The docking unit in a specific embodiment accommodating the iPOD™ MP3 player, the docking unit interconnects with the MP3 player via the MP3 player headphone and firewire ports. In other embodiments, accommodating MP3 players without firewire ports, the docking unit may interconnect with the MP3 player via the headphone and power port. The base docking unit contains within the unitary housing an FM transmitter and firewire power plug for the MP3 player. The base docking unit is provided with a matable plug coupling, for joining of the base docking unit to any of suitable power/charging components attachable thereto.

In another embodiment, the base docking unit of the FM transmitter and power supply/charging assembly is provided as a component of a multi-accessory kit. The kit comprises, in addition to the base docking unit, a ratcheting arm coupleable with a cigarette lighter power socket, e.g., a conventional 12 volt socket, in which the arm also functions as a mounting device which is pivotably adjustable to spatially position the MP3 player and affixed docking unit in any of a variety of spatial positions, relative to the user. The kit optionally also includes a short adaptor coupleable with a power supply, e.g., in a desk mount or wall mount plate. The kit optionally further includes a desk mount that is engagable with the short adaptor, to provide a desk mountable conformation of the MP3 player, and/or a wall mount plate for wall mounting of the FM transmitter and power supply/charging assembly, so that the MP3 player may be disposed in the modular docking unit as wall mounted.

Other aspects, features and advantages of the present invention will be more fully apparent from the ensuing disclosure and appended claims.

DETAILED DESCRIPTION OF THE INVENTION, AND PREFERRED EMBODIMENTS THEREOF

The present invention provides an integrated FM transmitter and power supply/charging assembly for an MP3 player, that dramatically increases the utility of the basic MP3 player.

The FM transmitter in the assembly of the invention transmits music played through the MP3 player to a range of FM frequencies, enabling FM reception of audio music signals that then can be played through an FM receiver, such as an FM radio receiver in a vehicle, a FM radio in proximity to the FM transmitter, and otherwise for extended area broadcast of the MP3 player-originated music. As one example, the base dock unit of the FM transmitter and power supply/charging assembly may be deployed in an automobile or other vehicular environment, wherein the unit is powered by a power adaptor plugged into a cigarette lighter socket of the vehicle.

The FM transmitter then transmits the MP3 player-originated music to the FM receiver in such vehicle, enabling the acoustic system of the vehicle to be employed for broadcast of the music to the interior passenger compartment of the vehicle.

The FM transmitter and power supply/charging assembly may as hereinafter described more fully comprise an AC charger enabling the battery of the MP3 player to be recharged to a more fully charged state allowing its use to be lengthened while on battery power.

The FM transmitter and power supply/charging assembly may be provided in a kit including the base docking unit and various adaptor/charger/mount accessories, as hereinafter described.

Although the ensuing discussion is directed to an embodiment having specific use and applicability to the iPOD MP3 player, it will be recognized that the utility of the invention is not thus limited, but rather extends to and encompasses other MP3 players. Accordingly, although the iPOD MP3 player utilizes a firewire port for power connection purposes, other types of port and electrical connection means may be employed.

Figure 1:
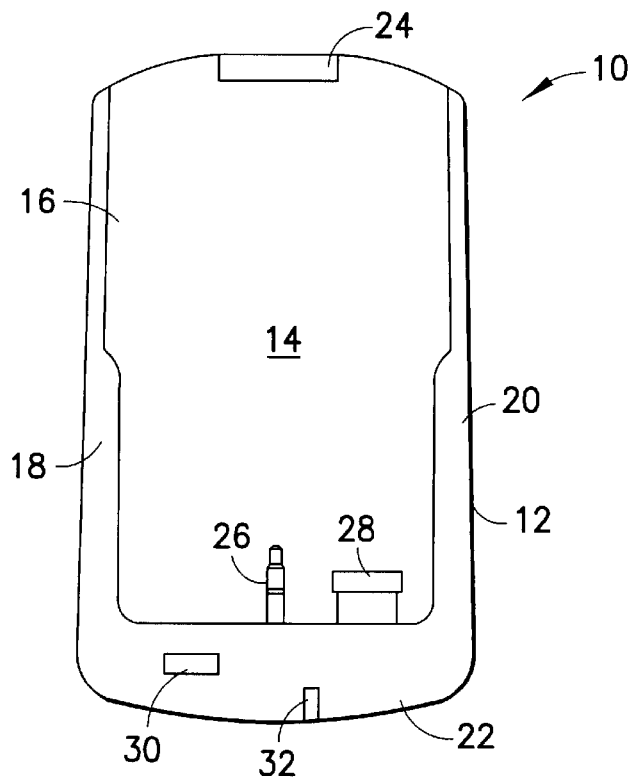
FIG. 1 is a front elevation view of an FM transmitter and power supply/assembly charging assembly according to one embodiment of the present invention.

Referring now to the drawings, FIG. 1 shows a front elevation view of an FM transmitter and power supply/ charging assembly 10 having a main body portion 12 including a back wall whose surface 14 together with side rails 18 and 20 define a cavity in which the MP3 player is selectively reposable. The FM transmitter and power supply/ charging assembly will be referred to hereinafter as the modular docking unit.

As shown in FIG. 1, the modular docking unit is provided with a male connector element 26 matably engagable with the headphone port of the MP3 player, as well as a coupling 28 matably engagable with the firewire port of the MP3 player.

In the housing of the modular docking unit is provided an FM transmitter, which transmits music played through the MP3 player to a range of FM frequencies. The FM transmitter may be of any suitable type, and operates to transmit music to an FM receiver in the vicinity of the MP3 player.

The FM transmitter may for example be provided having a tuning frequency in the FM band of 88–95 megaherz (MHz) and a transmission range of 4–6 feet or more. Stereo transmitters of such type are readily commercially available, and are of appropriate size for incorporation in the modular docking unit.

The FM transmitter may simply transmit at a frequency fixed in the aforementioned 88–95 MHz band, or the transmitter may be tunable to select a specific frequency within such spectrum.

In operation, the FM receiver receives the transmitted audio from the MP3 player transmitted by the modular docking unit, and the FM receiver, e.g., in a user's automobile, then is able to transmit the audio content to the vehicular sound system, e.g., by tuning the FM receiver to the frequency of the transmitter in the modular docking unit.

The modular docking unit in the interior of its housing also includes circuitry and components for charging the battery of the MP3 player, through the firewire power port or other electrical input port (e.g., USB or other port) to charge the MP3 player's battery, as well as providing power to the MP3 player when docked in the modular docking unit.

As shown in FIG. 1, the modular docking unit has on a lower portion 22 thereof indicator lights 30 and 32, which are configured for indicating when the MP3 player is charging or fully charged, and/or when the MP3 player is "ON."

The modular docking unit may also be provided with an ON/OFF switch, or selectively actuating the MP3 player, charging function of the modular docking unit, etc.

Figure 2:
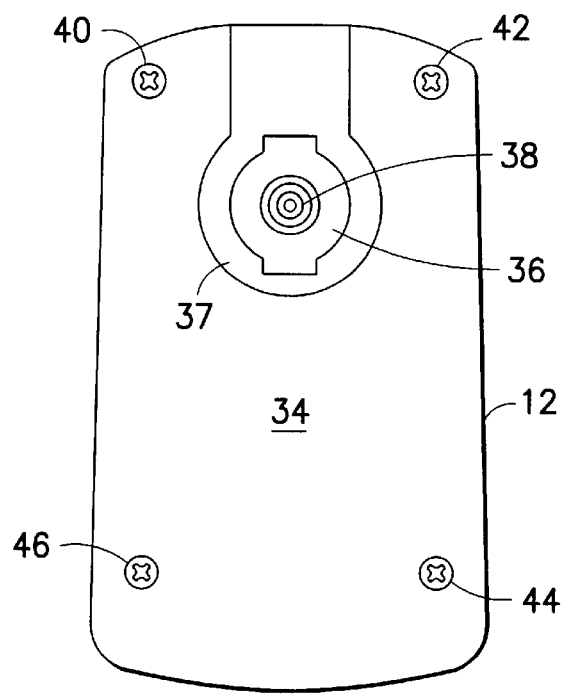
FIG. 2 is a rear elevation view of the FM transmitter and power supply/assembly charging assembly of FIG. 1.

FIG. 2 is a rear elevation view of the MP3 player, showing the back wall surface 34, on which is provided a boss 37 forming a coupling cavity 36 including a power connector element 38. The housing of the modular docking unit may be of a 2-piece construction, with mechanical fastener elements 40, 42, 44 and 46 serving to couple the respective parts of the unit. Alternatively, the modular docking unit may be formed of a unitary molded material, having a port or opening therein for insertion and assembly of the interior components, including circuitry and components as described hereinabove.

Figure 3:
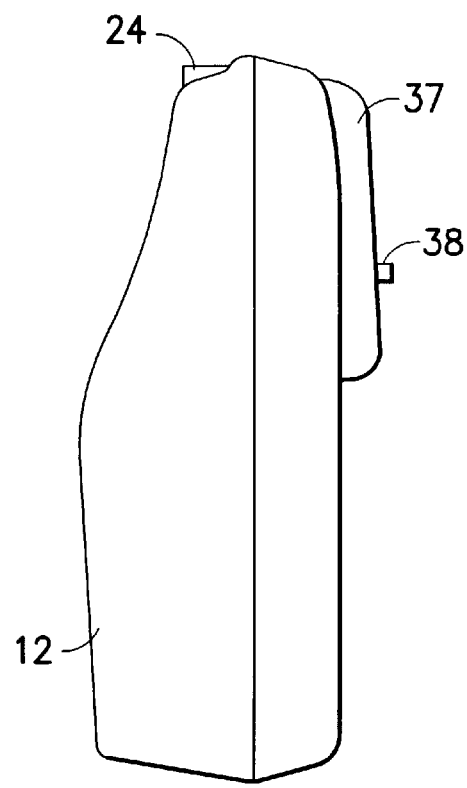
FIG. 3 is a right-hand side view, in elevation, of the assembly of FIGS. 1–2.
Figure 4:
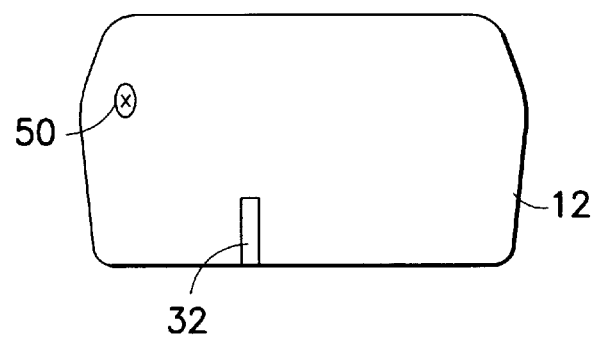
FIG. 4 is a bottom plan view of the assembly of FIGS. 1–2.

FIG. 3 is a right-hand side elevation view of the modular docking unit, showing the retention member 24 at the upper portion of the housing. FIG. 4 is a bottom plan view of the modular docking unit, including a further mechanical fastener 50 for retaining interior assembly elements of the unit.

Figure 5:
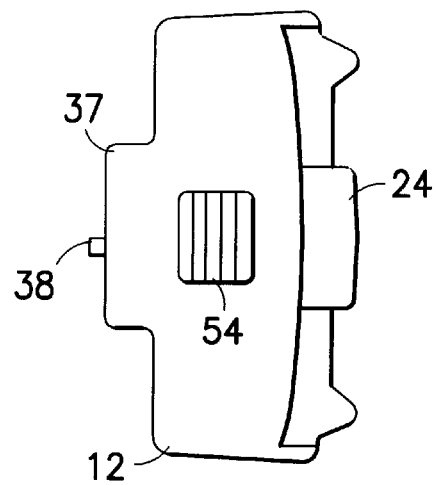
FIG. 5 is a top plan view of the assembly of FIGS. 1–2.

FIG. 5 is a top plan view of the modular docking unit, showing the retention member 24, which is selectively disengagable by thumb-actuatable release member 54.

Figure 6:
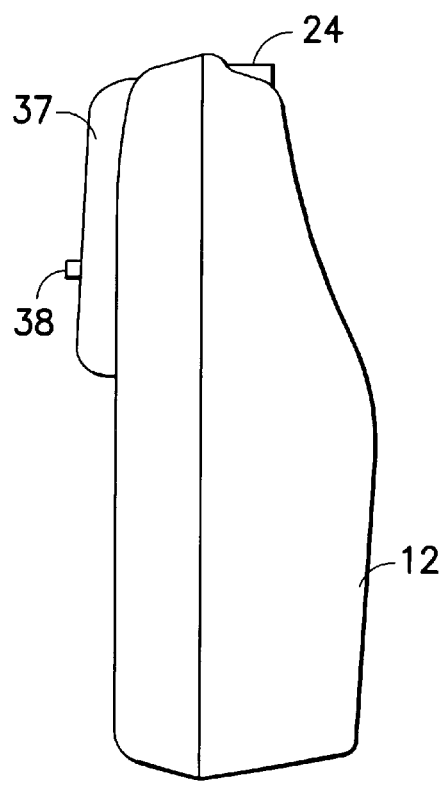
FIG. 6 is a left-hand side view, in elevation, of the assembly of FIGS. 1–2.

FIG. 6 is a left-hand side elevation view of the modular docking unit, showing the symmetrical character of same relative to the view illustrated in FIG. 3.

Figure 7:
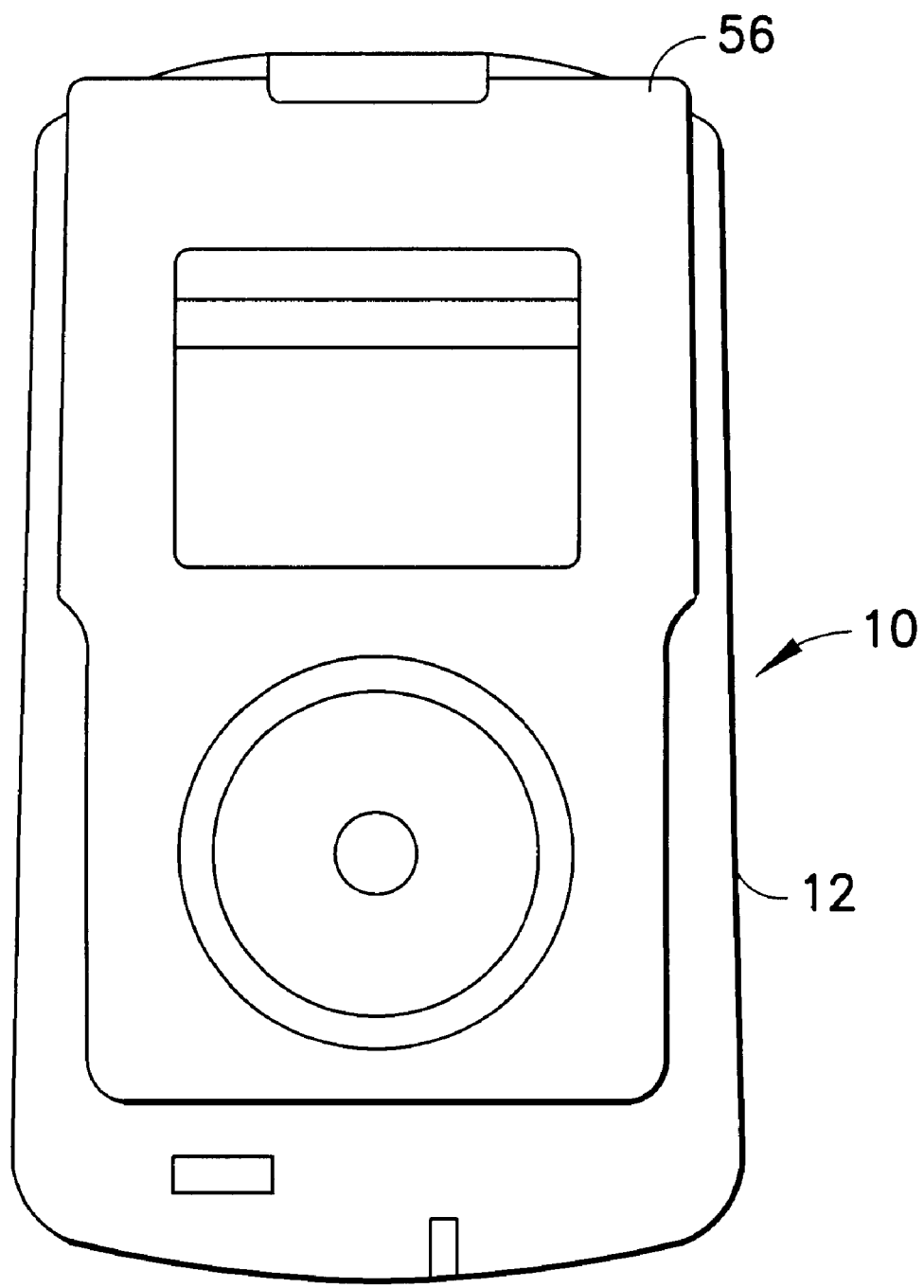
FIG. 7 is a front elevation view of the FM transmitter and power supply/assembly charging assembly of FIG. 1, with an MP3 player mounted therein.

FIG. 7 illustrates the FM transmitter and power supply/ charging assembly 10 having an MP3 player 56 disposed in the cavity of the body 12.

Figure 8:
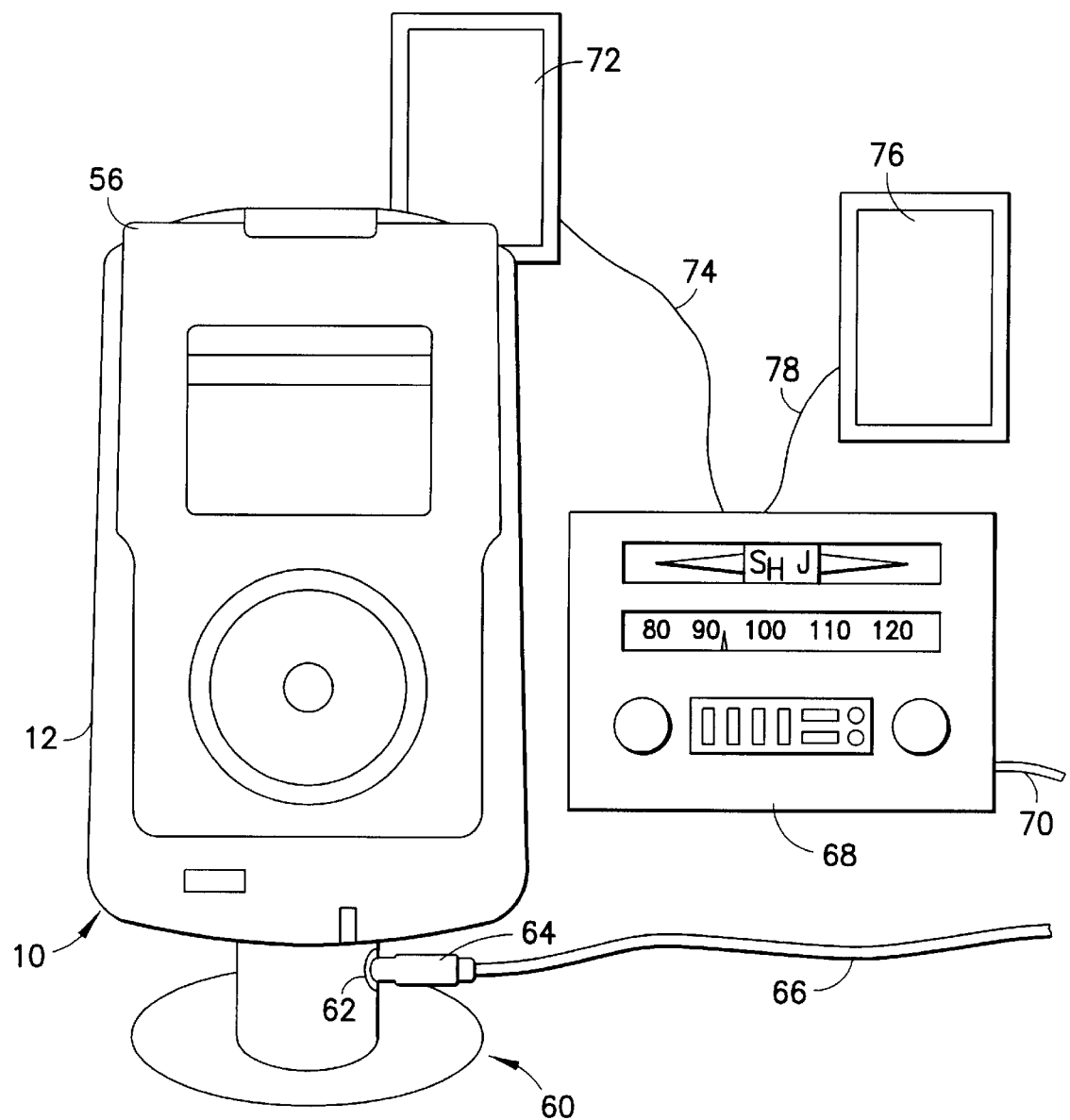
FIG. 8 is a schematic representation of an audio system including the modular docking unit of the FM transmitter and power supply/assembly charging assembly of the invention, having an MP3 player mounted therein, and arranged in FM transmitting relationship to an FM receiver having audio speakers attached thereto.

FIG. 8 is a corresponding view of MP3 player 56 mounted in the body 12 of the FM transmitter and power supply/ charging assembly 10. In this configuration, the modular docking unit is mounted on a pedestal 60 having an arm extending upwardly at the rear of the modular docking unit and coupling with the power element 38 on boss 37 (see FIGS. 2, 3 and 6). The pedestal 60 is provided with an electrical coupling 62 accommodating power plug 64 connected to power cord 66, providing power to the pedestal 60 for transmittal through contact 38 to the MP3 player by element 28, as shown in FIG. 1.

When the MP3 player is actuated to play the stored audio content, the corresponding signal is transmitted through coupling element 26 shown in FIG. 1 to the FM transmitter in the housing of the modular docking unit, generating an FM signal that is transmitted to FM receiver 68 powered by power cord 70. The FM receiver 68 in turn is coupled by speaker wires 74 and 78 to speakers 72 and 76, respectively. In such manner, the audio content played by the MP3 player 56 is transmitted by the FM transmitter to FM receiver 68 and outputted as sound output at speakers 72 and 76.

Concurrently, the MP3 player can be electrically charged to renew the battery power of the unit, so that when undocked from the modular docking unit, the MP3 player may be outfitted with earphones and deployed in a personal listening arrangement.

Although the FIG. 8 embodiment is shown as including a table-type FM receiver, it will be recognized that the arrangement is illustrative only, and is adaptable to automotive or vehicular sound systems including an FM receiver.

The modular docking unit as shown in FIGS. 1–6 may be coupled with a power source in any suitable manner.

Figure 9:
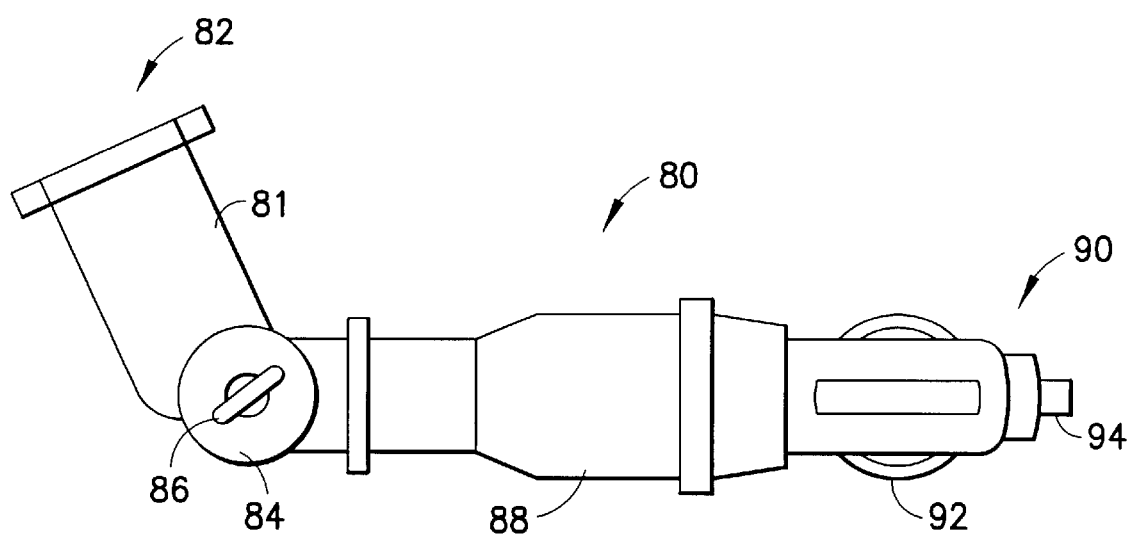
FIG. 9 is a pivotably adjustable ratchet adaptor, which is coupleable with a cigarette lighter power socket, e.g., a conventional 12 volt socket, wherein the outer coupling end of the adaptor is engagable with the port on the rear face of the docking unit of the FM transmitter and power supply/charging assembly, with the ratchet arm being pivotably adjustable to spatially position the MP3 player at a given orientation relative to a user.

FIG. 9 shows a ratchet-type adaptor 80 including engagement structure 82 matable with the cavity 36 shown in FIG. 2 on the modular docking unit. The coupling structure 82 is at the face of tubular member 81 which is pivotably mounted on spindle 84 which is positionable by means of the manual wing-nut 86, which is selectively manually tightenable or loosenable, to adjust the attitude of tubular member 81 relative to the main body 88 of the adaptor. The main body 88 is joined to a plug end 90 featuring electrical contact elements 92 and 94, for engagement of the plug end 90 with a corresponding socket, such as a cigarette lighter socket of a motor vehicle.

Figure 10:
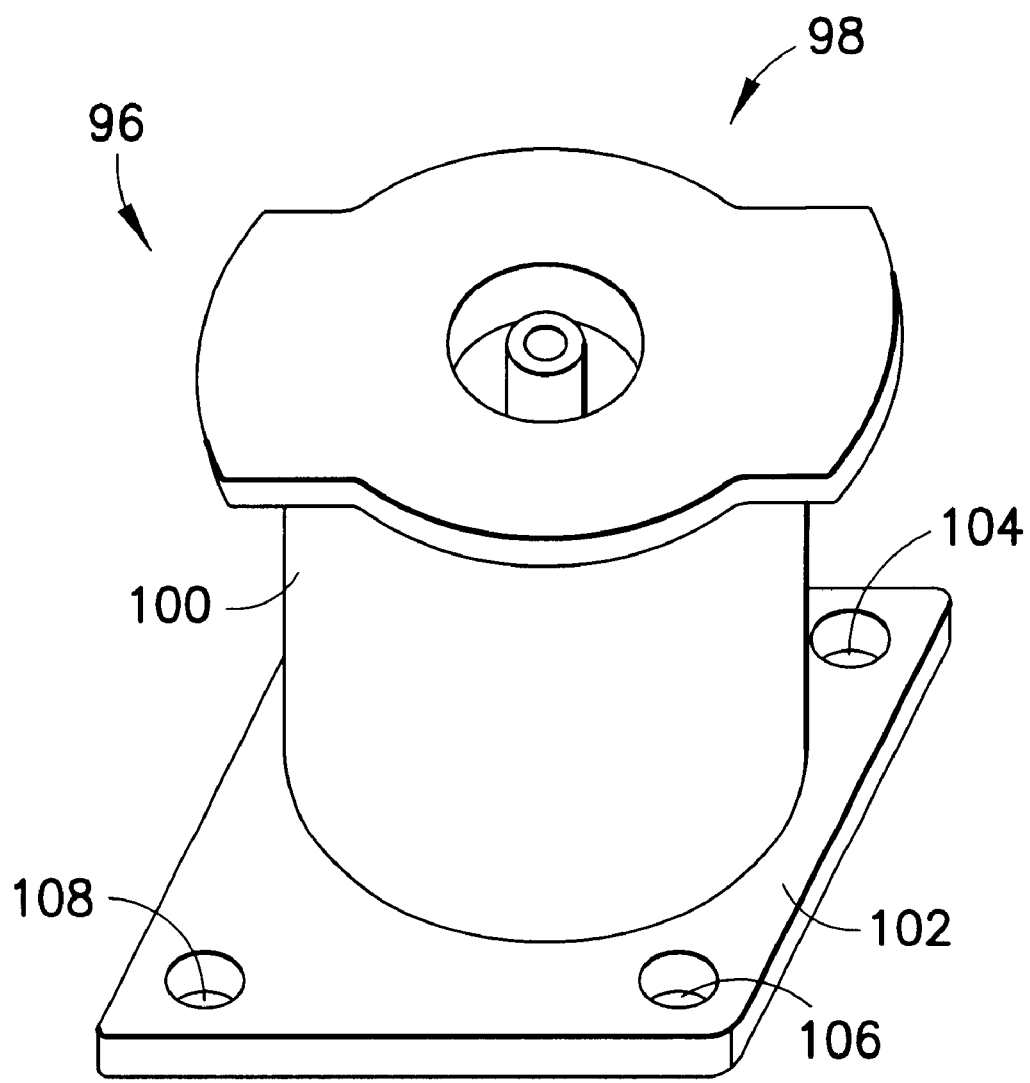
FIG. 10 is a short adaptor coupleable with the coupling structure on the rear face of the docking unit of FIGS. 1–6, wherein the adaptor includes a wall mounting plate, accommodating wall mounting of the FM transmitter and power supply/charging assembly.

FIG. 10 shows another adaptor 96 having engagement structure 98 at the extremity of cylindrical member 100 mounted on plate number 102. The engagement structure 98 is engagable with the cavity 37 at the rear face of the modular docking unit (see FIG. 2).

The plate 102 shown in FIG. 10 is provided with mounting openings 104, 106 and 108, for wall-attachment of the adaptor, using mounting screws, nails, etc.

The adaptor shown in FIG. 10 permits the modular docking unit to be wall-mounted, whereby the MP3 player may be selectively docked and undocked from the wall-mounted modular docking unit.

Figure 11:
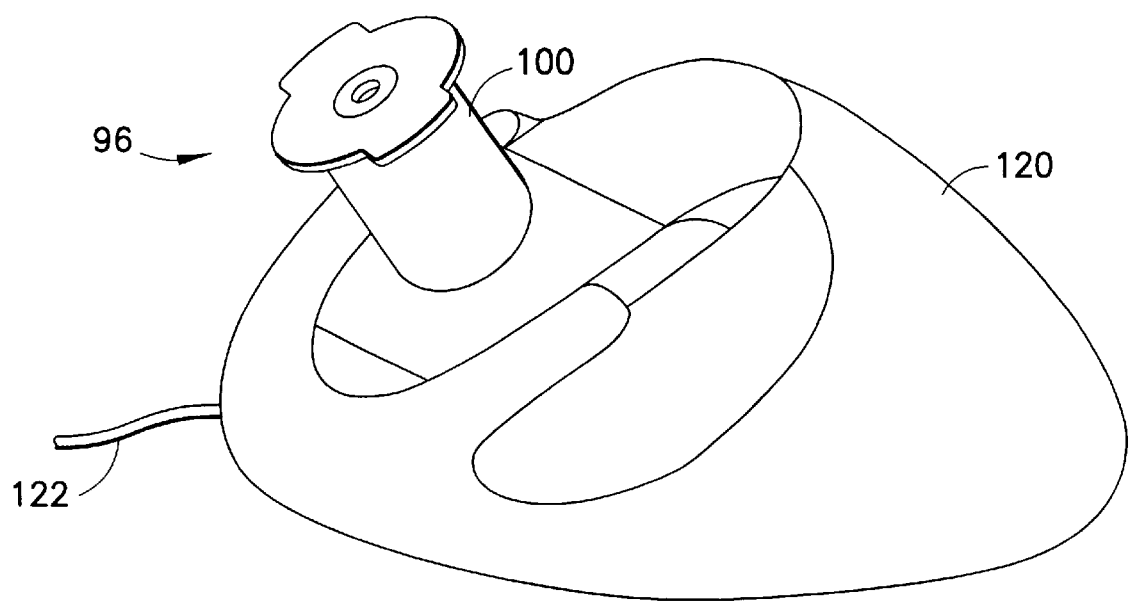
FIG. 11 is a desk mount device, in which the short adaptor of FIG. 10 may be reposed, to provide desktop access of a user to the MP3 player as reposed in the docking unit coupled with the adaptor mounted on the desk mount article.

FIG. 11 is a perspective view of a desk mount article 120, in which the short adaptor 96 shown in FIG. 10 may be selectively reposed, or coupling with the desk mount article 120 joined to power cord 122.

The modular docking unit as shown in FIGS. 1–6 may thereby be coupled with the adaptor 96 of the desk mount article by engagement of the engagement structure with the cavity 37 and electrical coupling 38 as shown in FIG. 2.

It will therefore be recognized that the FM transmitter and power supply/charging assembly of the present invention may be widely varied in specific structure, while providing FM transmission ability to the MP3 player docked therein, and concurrently providing charging capability to the MP3 player battery, as well as power during docked usage of the MP3 player.

The various adaptor units shown, as well as the associated mounting articles, may be provided as a kit together with the FM transmitter and power supply/charging assembly, to provide a package of alternative parts for varied deployment of the docked MP3 player.

While the invention has been described herein with respect to various illustrative aspects, features and embodiments, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope.

What is claimed is:

1. An FM transmitter and power supply/charging assembly electrically coupleable with an MP3 player, said assembly comprising a modular docking unit having a main body portion with a docking cavity therein, wherein the main body portion contains said FM transmitter and power/charging circuitry, with coupling means in the docking cavity for connecting the MP3 player with the FM transmitter and power/charging circuitry, to accommodate FM transmission by said FM transmitter of audio content when played by said MP3 player in the docking cavity of the modular docking unit, and with means for transmitting electrical power through said modular docking unit and said power/charging circuitry therein, for charging of a battery of the MP3 player and/or powering of the MP3 player.

2. The assembly of claim 1, wherein the coupling means in the docking cavity comprises a firewire coupling.

3. The assembly of claim 1, wherein the modular docking unit comprises at least one indicator light indicative of the operational state of the unit.

4. The assembly of claim 3, wherein the indicator light indicates the "ON" or "OFF" state of the unit.

5. The assembly of claim 3, wherein the indicator light indicates the charging status of a battery in an MP3 player docked in the cavity of the modular docking unit.

6. The assembly of claim 1, wherein the modular docking unit comprises a housing formed of polymeric material.

7. The assembly of claim 1, wherein the FM transmitter has a transmission range of up to about 6 feet.

8. The assembly of claim 1, wherein the FM transmitter produces an output frequency audio signal in a range of from about 85 to about 95 Megaherz.

9. The assembly of claim 8, wherein said FM transmitter produces a single output frequency signal in said range.

10. The assembly of claim 8, wherein said FM transmitter produces a variable output frequency signal in said range.

11. The assembly of claim 1, which is constructed and arranged to dock with an iPOD™ MP3 player.

12. A sound system including an FM transmitter and power supply/charging assembly as in claim 1, and an MP3 player docked in the docking cavity of the modular docking unit of said assembly.

13. The sound system of claim 12, wherein the MP3 player comprises an iPOD™ MP3 player.

14. The sound system of claim 12, arranged for transmission of music to a table-type FM receiver.

15. The sound system of claim 12, arranged for transmission of music to a vehicular FM receiver for outputting of sound from vehicular audio speakers.

16. The sound system of claim 12, wherein the MP3 player includes a firewire port.

17. The sound system of claim 12, wherein the FM transmitter has a transmission range of up to about 6 feet.

18. The sound system of claim 12, wherein the FM transmitter produces an output frequency audio signal in a range of from about 85 to about 95 Megaherz.

19. The sound system of claim 12, wherein the FM transmitter produces an output variable frequency audio signal in a range of from about 85 to about 95 Megaherz.

20. An MP3 player accessory kit, comprising an FM transmitter and power supply/charging assembly as in claim 1, and at least one power adaptor/charger for said FM transmitter and power supply/charging assembly.

* * * * *

UNITED STATES PATENT AND TRADEMARK OFFICE
CERTIFICATE OF CORRECTION

PATENT NO. : 6,591,085 B1 Page 1 of 1
DATED : July 8, 2003
INVENTOR(S) : Grady

It is certified that error appears in the above-identified patent and that said Letters Patent is hereby corrected as shown below:

<u>Column 1,</u>
Line 30, "CAlif." should be -- Calif. --.

Signed and Sealed this

Twenty-first Day of October, 2003

JAMES E. ROGAN
*Director of the United States Patent and Trademark Office*